(12) United States Patent
Saito et al.

(10) Patent No.: US 6,677,409 B2
(45) Date of Patent: Jan. 13, 2004

(54) METHOD OF PRODUCING VINYL-BASED POLYMER

(75) Inventors: Ryuichi Saito, Kashima-gun (JP); Tadashi Amano, Kashima-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/122,304

(22) Filed: Apr. 16, 2002

(65) Prior Publication Data

US 2002/0183463 A1 Dec. 5, 2002

(30) Foreign Application Priority Data

Apr. 17, 2001 (JP) ........................................ 2001-118820

(51) Int. Cl.$^7$ .................................................. C08F 2/40
(52) U.S. Cl. ........................ 526/84; 524/804; 524/834; 524/459
(58) Field of Search ................................ 524/804, 834, 524/459; 526/84

(56) References Cited

U.S. PATENT DOCUMENTS 4,748,218 A * 5/1988 Sharaby ........................ 526/84

FOREIGN PATENT DOCUMENTS

JP 7-113041 * 12/1995

* cited by examiner

Primary Examiner—David W. Wu
Assistant Examiner—William Cheung
(74) Attorney, Agent, or Firm—Oblon, Spivak, McClelland, Maier & Neustadt, P.C.

(57) ABSTRACT

A method of producing a vinyl-based polymer is provided in which the blocking of piping resulting from solidification of a reaction inhibitor does not occur even if the operation of supplying the reaction inhibitor is conducted at a low temperature. This method involves the polymerization of a vinyl monomer via a radical reaction, wherein a reaction inhibitor formed from a compound represented by a general formula (1), shown below, is added to the polymerization system in the form of an aqueous dispersion, either prior to commencement of the polymerization, during the polymerization, or following completion of the polymerization, depending on the effect desired.

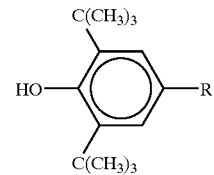

(1)

R represents an alkyl group of 3 to 6 carbon atoms.

12 Claims, No Drawings

METHOD OF PRODUCING VINYL-BASED POLYMER

BACKGROUND OF THE INVENTION

1. Field of the Invention

The present invention relates to a method of producing a vinyl-based polymer, and in particular to a method using a reaction inhibitor during the polymerization of a vinyl monomer by a radical reaction.

2. Description of the Prior Art

In conventional radical polymerization reactions of vinyl monomers, reaction inhibitors (also known as reaction suppressants) have typically been added to the polymerization system, and examples of such reaction inhibitors include phenol based compounds, sulfur compounds, N-oxide compounds, phosphorus compounds, and unsaturated hydrocarbon compounds. Specific examples of the phenol based compounds include 2,2-di-(4'-hydroxyphenyl) propane, hydroquinone, p-methoxyphenol, t-butylhydroxyanisole, n-octadecyl-3-(4-hydroxy-3,5-di-t-butylphenyl)propionate, t-butylhydroquinone, 2,5-di-t-butylhydroquinone, 4,4'-butylidenebis-(3-methyl-6-t-butyl) phenol, 3,5-di-t-butyl-4-hydroxytoluene, 2,2'-methylene-bis-(4-ethyl-6-t-butyl)phenol, triethyleneglycol-bis[3-(3-t-butyl-5-methyl-4-hydroxyphenyl)propionate], pentaerythrityl-tetrakis[3-(3,5-di-t-butyl-4-hydroxyphenol) propionate], t-butylcatechol, 4,4'-thiobis-(6-t-butyl)-m-cresol, and tocopherol.

These reaction inhibitors may either be added to the polymerization system prior to commencement of the polymerization reaction in order to reduce the occurrence of fish eyes within the product polymer (Japanese Laid-open publication (kokai) No. 48-49990 (JP48-49990A), Japanese Post-Examination Publication (kokoku) No. 60-50366 (JP60-50366B)), added during the polymerization reaction in order to suppress heat kick, or alternatively added at or after the completion of the polymerization reaction in order to prevent postpolymerization and prevent deterioration in the anti-initial discoloration property resulting from heat history (U.S. Pat. No. 3,642,756, Japanese Laid-open publication (kokai) No. 57-185302 (JP57-185302A), and Japanese Laid-open publication (kokai) No. 62-503 (JP62-503A)). Furthermore, such reaction inhibitors are also used for halting rapid reactions which occur during abnormal reactions.

Amongst the above reaction inhibitors, 2,2-di-(4'-hydroxyphenyl)propane displays excellent reaction inhibiting properties, enables the production of high quality polymers, and also produces very little adhesion of scale to the polymerization vessel, and has consequently been widely used at the completion of polymerization reactions.

However, 2,2-di-(4'-hydroxyphenyl)propane is a solid at room temperature, and unless the material is dissolved in an organic solvent such as methanol prior to use, then the operation of supplying the reaction inhibitor to the reaction vessel via the supply line is problematic. Consequently, because this method requires the use of an organic solvent, not only are there associated physical dangers for the operators exposed to the fumes, but these fumes also become a source of environmental pollution.

Consequently, in Japanese Post-Examination Publication (kokoku) No. 7113041 (JP7-113041B) a reaction inhibitor represented by a general formula (1) shown below was disclosed as an alternative to 2,2-di-(4'-hydroxyphenyl) propane.

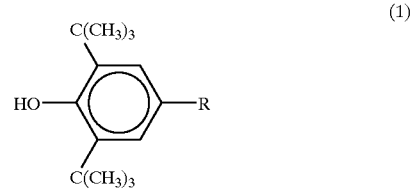

(wherein, R represents an alkyl group of 3 or more carbon atoms)

Specifically, the compound in which the R group is a sec-butyl group, namely, 2,6-di-t-butyl-4-sec-butylphenol is currently used. This compound is a liquid at room temperature, and so is able to be supplied to the polymerization vessel via the supply line without requiring the use of a solvent.

However, the solidifying point of this reaction inhibitor is between 18 and 20° C., and so in cases in which the external temperature is cold, namely 10° C. or lower, the compound enters a supercooled state, and as a result, the reaction inhibitor may begin to crystallize, thereby blocking the supply piping. Consequently, in those cases in which the reaction inhibitor is introduced from the supply line to the polymerization vessel within a low temperature external environment, an organic solvent such as methanol must be used to dissolve the reaction inhibitor, and consequently this compound does not completely resolve the aforementioned problems of physical danger for the operators and environmental pollution.

Furthermore, in cases in which cold temperatures result in the reaction inhibitor solidifying and blocking the supply piping, a device for heating the supply piping to melt any solidified reaction inhibitor and prevent blocking of the piping can be installed, although if this heating is overly vigorous, the reaction inhibitor may undergo thermal decomposition causing a reduction in the reaction inhibiting property and increasing the likelihood of a discolored product polymer. Furthermore, in terms of operating efficiency, the heating operation using a heating device or the like increases the complexity of the process.

SUMMARY OF THE INVENTION

The present invention takes the above factors in consideration, with an object of providing a method of producing a vinyl-based polymer in which problems such as the blocking of piping resulting from solidification of a reaction inhibitor do not arise even if the operation of supplying the reaction inhibitor is conducted at low temperatures and without the use of an organic solvent.

As a result of intensive research aimed at resolving the issues described above, the inventors of the present invention discovered that when polymerizing a vinyl monomer, if the reaction inhibitor is dispersed in an aqueous medium prior to use, then the polymerization can be performed without the occurrence of pipe blockage problems and the like resulting from solidification of the reaction inhibitor, and were hence able to complete the present invention.

In other words, the present invention provides a method of producing a vinyl-based polymer by polymerizing a vinyl monomer via a radical reaction, wherein a reaction inhibitor comprising a compound represented by a general formula (1), shown below, is added to the polymerization system in the form of an aqueous dispersion.

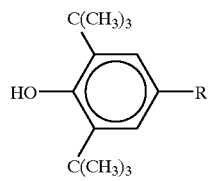

(1)

wherein, R represents an alkyl group of 3 to 6 carbon atoms.

DETAILED DESCRIPTION OF THE PREFERRED EMBODIMENTS

As follows is a more detailed description of the present invention.

The terminology "polymerization system" herein means an aqueous mixture of materials charged in a polymerization vessel before the initiation of polymerization reaction or an aqueous reaction mixture in the polymerization vessel during, or at or after the completion of polymerization reaction.

In the present invention, in the polymerization of a vinyl monomer via a radical reaction, a reaction inhibitor represented by the aforementioned general formula (1) (wherein, R represents an alkyl group of 3 to 6 carbon atoms) is dispersed in an aqueous medium prior to being added to the polymerization system. In order to add the reaction inhibitor to the polymerization system, a dispersion such as an emulsion or a suspension is first prepared by dispersing the reaction inhibitor in an aqueous medium, with the aid of a dispersant such as an emulsifier or a suspension agent, and this dispersion is then added to the polymerization system. This dispersion comprises fine particles of the reaction inhibitor of diameter from 1 to 30 $\mu$m dispersed in water, in other words, an oil in water type emulsion, and should preferably comprise protective colloids.

In cases in which the reaction inhibitor retains a liquid form despite being cooled below melting point, in other words, cases in which the reaction inhibitor is in a supercooled state, crystallization is accelerated by factors such as the presence of crystal nuclei or the surface state of the storage vessel and the piping. For example, if the reaction inhibitor is 2,6-di-tert-butyl-4-sec-butylphenol, then the melting point is approximately 20° C., and so at temperatures below 20° C., the addition of a small amount of solid 2,6-di-tert-butyl-4-sec-butylphenol to the liquid 2,6-di-tert-butyl-4-sec-butylphenol will result in crystal growth, until the entire sample solidifies. This problem is the cause of the reaction inhibitor solidifying and blocking the piping in those cases where the supply of the reaction inhibitor is performed using the neat liquid.

However, in cases in which fine particles of the reaction inhibitor are dispersed in water and form protective colloids, even if crystal nuclei are present, the reaction inhibitor is protected by the water, and because the crystals and the liquid form reaction inhibitor do not come into direct contact, crystal growth is unlikely to proceed, and as a result the reaction inhibitor is less likely to solidify. Consequently, even at low temperatures, the reaction inhibitor can be introduced into the polymerization system without blocking the reaction inhibitor supply piping, without requiring the use of organic solvents such as methanol and toluene, and furthermore without requiring heating of the supply piping.

The dispersion incorporates three constituents, namely, the reaction inhibitor, a dispersant, and an aqueous medium, and the amount of the reaction inhibitor is typically from 1.0 to 80 parts by weight, and preferably 20 to 50 parts by weight, per 100 parts by weight of the dispersion. At amounts less than 1.0 parts by weight, the volume of the dispersion per unit of reaction inhibitor becomes overly large, causing problems relating to operational efficiency. At amounts exceeding 80 parts by weight, the viscosity of the dispersion becomes extremely high, and there is a possibility of problems arising associated with introducing the dispersion to the polymerization vessel.

The dispersant is typically used in amounts of 0.25 to 10 parts by weight, and preferably 2 to 5 parts by weight, per 100 parts by weight of the dispersion. At quantities less than 0.25 parts by weight, the stability of the dispersion is unsatisfactory and the dispersion becomes prone to separation. In contrast, at quantities exceeding 10 parts by weight, the viscosity of the dispersion becomes extremely high, and there is a possibility of problems arising associated with introducing the dispersion to the polymerization vessel.

Deionized water is typically used for the aqueous medium. From considerations of the stability and the viscosity of the dispersion, the water content of the dispersion should preferably be from 40 to 80 parts by weight per 100 parts by weight of the dispersion. In addition, during preparation of the dispersion, an antifoaming agent may also be added to prevent the incorporation of air bubbles into the dispersion.

There are no particular restrictions on the method of preparing the dispersion, and simply mixing the reaction inhibitor with a dispersant containing aqueous medium using the mechanical forces of a simple stirring device is suitable. However, if the stirring action is overly vigorous, then air bubbles are more likely to become incorporated within the dispersion, and the viscosity of the dispersion may become extremely large, resulting in the possibility of problems arising associated with introducing the dispersion to the polymerization vessel.

Examples of dispersants which can be used in the present invention include water soluble polymers such as partially saponified polyvinyl alcohol, water soluble cellulose ether and gelatin, and emulsifiers such as nonionic surfactants, higher alcohol based surfactants and anionic surfactants. Of these, partially saponified polyvinyl alcohol produces dispersions which are not overly viscous, and is also unlikely to affect the anti-initial discoloration property of the molded product, and is consequently most preferred.

The saponification ratio of the partially saponified polyvinyl alcohol used as the dispersant should preferably be from 70 to 92 mol %. If the saponification ratio is less than 70%, then the solubility of the dispersant in water, and more particularly the solubility in water at high temperatures, is unsatisfactory, and consequently the effect of the dispersant is reduced. In contrast, if the saponification ratio exceeds 92 mol %, then the protective colloid weakens, causing a destabilization of the dispersion between the aqueous medium and the reaction inhibitor, and consequently the likelihood of a liquid separation occurring between the reaction inhibitor and the aqueous medium increases, and furthermore hot water is also required for dissolving the dispersant, which further complicates the operation. The degree of polymerization of the partially saponified polyvinyl alcohol should preferably be no more than 2500, with values from 500 to 1000 being particularly preferred. If the degree of polymerization exceeds 2500, then the viscosity of the produced dispersion increases markedly, and there is a possibility of problems arising associated with introducing the dispersion to the polymerization vessel.

Examples of nonionic surfactants which can be used as the dispersant include ether based compounds such as alkyl and alkylaryl polyoxyethylene ethers and the like, ether ester based compounds such as polyoxyethylene ethers of sorbitan esters, and ester based compounds such as sorbitan esters. Examples of typically used higher alcohol based surfactants include straight chain or branched alkyl or alkenyl alcohols of output member 12 to 18 carbon atoms, and specific examples include lauryl alcohol and stearyl alcohol. Examples of anionic surfactants include fatty acid salts, specifically, laurates, stearates and palmitates.

In a method of producing a vinyl-based polymer according to the present invention, suitable examples of the vinyl monomer include halogenated vinyl or halogenated vinylidene compounds such as vinyl chloride, vinyl bromide and vinylidene chloride; polymerizable olefinic monomers with at least one terminal $CH_2$=C<group including acrylic esters such as methyl acrylate, ethyl acrylate, butyl acrylate, octyl acrylate and cyanoethyl acrylate; vinyl acetate; methacrylate esters such as methyl methacrylate and butyl methacrylate; styrene and styrene derivatives such as α-methylstyrene, vinyltoluene and chlorostyrene; vinylnaphthalene; diolefins such as butadiene, isoprene and chloroprene; as well as mixtures of the above monomers with other copolymerizable olefin monomers; and other known polymerizable olefin monomers.

A method of producing a vinyl-based polymer according to the present invention can be applied to any type of radical polymerization reaction, regardless of form, including suspension polymerization, emulsion polymerization, bulk polymerization and microsuspension polymerization.

Depending on the effect desired, the reaction inhibitor should be added to the reaction system in at least one of three stages, namely, prior to commencement of the polymerization, during the polymerization, or at or after the completion of the polymerization. The quantity of the reaction inhibitor added is typically within a range from 0.0005 to 0.5 parts by weight per 100 parts by weight of the vinyl monomer. Specifically, in those cases in which the reaction inhibitor is added prior to the polymerization in order to reduce the occurrence of fish eyes in the product polymer, an amount of reaction inhibitor from 0.0005 to 0.005 parts by weight per 100 parts by weight of the vinyl monomer is preferred. In such cases, heating the aqueous medium prior to supply is particularly effective. In those cases in which the reaction inhibitor is added at the end (but before the completion) of the polymerization in order to halt the reaction at the point where a predetermined polymerization conversion rate has been reached, and prevent any subsequent polymerization, an amount of reaction inhibitor from 0.005 to 0.05 parts by weight per 100 parts by weight of added vinyl monomer is preferred. Furthermore, in those cases in which the reaction inhibitor is added to the polymerization system in order to completely halt the polymerization reaction in emergency situations, an amount of reaction inhibitor from 0.2 to 0.5 parts by weight per 100 parts by weight of added vinyl monomer is preferred.

In the meantime, it is assumed that the polymerization has been completed when the pressure inside the polymerization vessel falls to 1.0 kPa or lower.

As follows is a description of a method of producing a vinyl-based polymer according to the present invention, in the case of a suspension polymerization.

Suspension polymerization is carried out in an aqueous medium, in the presence of a known polymerization initiator and a dispersant, and typically at a temperature between 0 and 100° C., with temperatures from 30 to 70° C. being particularly preferred. There are no particular restrictions on the dispersant and the polymerization initiator used, and compounds used in conventional vinyl monomer polymerization reactions are suitable. Specific examples of the dispersant include water soluble cellulose ether compounds such as methyl cellulose, hydroxyethyl cellulose, hydroxypropyl cellulose and hydroxypropylmethyl cellulose, water soluble or oil soluble partially saponified polyvinyl alcohols, water soluble polymers such as acrylic acid polymers and gelatin, oil soluble emulsifiers such as sorbitan monolaurate, sorbitan trioleate, glycerin tristearate, and block copolymers of ethylene oxide and propylene oxide, and water soluble emulsifiers such as polyoxyethylene sorbitan monolaurate, polyoxyethylene glycerin oleate and sodium laurate, and these dispersants may be used singularly, or in combinations of two or more different dispersants. There are no particular restrictions on the amount of dispersant added, although typically from 0.01 to 5 parts by weight of the dispersant is used per 100 parts by weight of the monomer.

Examples of the polymerization initiator include percarbonate compounds such as diisopropyl peroxydicarbonate, di-2-ethylhexyl peroxydicarbonate and diethoxyethyl peroxydicarbonate, perester compounds such as t-butyl peroxyneodecanoate, t-butyl peroxypivalate, t-hexyl peroxypivalate, α-cumyl peroxyneodecanoate and 2,4,4-trimethylpentyl-2-peroxy-2-neodecanoate, peroxides such as acetyl cyclohexylsulfonyl peroxide, 2,4,4-trimethylpentyl-2-peroxyphenoxy acetate, 3,5,5-trimethylhexanoyl peroxide and isobutyryl peroxide, and azo compounds such as azobis-2,4-dimethylvaleronitrile, azobis(4-methoxy)-2,4-dimethylvaleronitrile, as well as ammonium persulfate and hydrogen peroxide and the like, and these polymerization initiators may be used singularly, or in combinations of two or more different initiators. There are no particular restrictions on the amount of polymerization initiator added, although typically from 0.01 to 1 part by weight of the polymerization initiator is used per 100 parts by weight of the monomer.

In term of other conditions associated with the suspension polymerization, there are no particular restrictions on factors such as the method of supplying the aqueous medium to the polymerization vessel and performing degassing, the method of supplying the vinyl monomer, other comonomers if required, the dispersant and the polymerization initiator, or the relative proportions of the above constituents, and typical conditions are suitable. Moreover, where necessary, other additives typically used in the polymerization of vinyl monomers such as polymerization degree regulators, chain transfer agents, pH regulating agents, gelation improvers, antistatic agents, antioxidants and scale adhesion prevention agents may also be added to the polymerization system.

EXAMPLES

As follows is a description of specifics of the present invention using a series of examples and comparative examples. However, the present invention is in no way limited to the examples presented.

Example 1
(Preparation of a Reaction Inhibitor Dispersion)

50 g of a partially saponified polyvinyl alcohol with a saponification ratio of 88% and a degree of polymerization of approximately 1000 was dissolved in 550 g of deionized water. 400 g of 2,6-di-t-butyl-4-sec-butylphenol was then mixed into the solution, and following the subsequent addition of 0.5 g of a silicone based antifoaming agent, the resulting mixture was stirred for 2 hours using a rotational speed of 1000 rpm. This process yielded a 40% by weight dispersion of the reaction inhibitor, with a viscosity at 20° C. of 250 mPa.s. Even when left to stand for one day, this emulsified dispersion showed no obvious liquid separation.

(Production of a Polymer)

In the case of an external temperature of 5° C., the polyvinyl chloride was produced in the following manner.

In a 2000 L capacity polymerization vessel equipped with a stirrer and a jacket were placed 800 kg of deionized water, 210 g of a partially saponified polyvinyl alcohol as a dispersant, and 80 g of hydroxypropylmethyl cellulose. Subsequently, the reaction system was degassed until the internal pressure of the polymerization vessel reached 0.013 MPa, and 720 kg of a vinyl chloride monomer was then added. With constant stirring, 300 g of diethylhexyl peroxydicarbonate, 130 g of t-butyl peroxyneodecanoate and 30 g of cumyl peroxyneodecanoate were then combined with the reaction mixture, while the temperature was raised to 57° C. by passing hot water through the jacket. The polymerization was then allowed to progress at this temperature.

When the internal pressure of the polymerization vessel had fallen to 0.6 MPa, 250 g of the reaction inhibitor dispersion prepared in the manner outlined above was added to the system via the supply line, and following recovery of the unreacted monomer, the reaction mixture slurry was removed from the polymerization vessel and dewatered in a centrifuge. The thus obtained dewatered cake was then dried for 3 hours at 70° C. in a batch fluidized drying device to yield a product polymer.

Example 2

(Preparation of a Reaction Inhibitor Dispersion)

25 g of a partially saponified polyvinyl alcohol with a saponification ratio of 80% and a degree of polymerization of approximately 2000 was dissolved in 575 g of deionized water. 400 g of 2,6-di-t-butyl-4-sec-butylphenol was then mixed into the solution, and following the subsequent addition of 0.5 g of a silicone based antifoaming agent, the resulting mixture was stirred for 2 hours using a rotational speed of 1000 rpm. This process yielded a 40% by weight dispersion of the reaction inhibitor, with a viscosity at 20° C. of 330 mPas. Even when left to stand for one day, this emulsified dispersion showed no obvious liquid separation.

(Production of a Polymer)

In the case of an external temperature of approximately 5° C., the polymerization of the vinyl chloride monomer was conducted in a similar manner to that described for the example 1, and then when the internal pressure of the polymerization vessel had fallen to 0.6 MPa, 250 g of the reaction inhibitor dispersion prepared in the manner outlined above was added to the system via the supply line, and the product polymer was then produced in a similar manner to the example 1.

Comparative Example 1

In the case of an external temperature of approximately 5° C., the polymerization of the vinyl chloride monomer was conducted in a similar manner to that described for the example 1, and then when the internal pressure of the polymerization vessel had fallen to 0.6 MPa, 100 g of 2,6-di-t-butyl-4-sec-butylphenol diluted with 500 g of methanol was added via the supply line as a reaction inhibitor, and the product polymer was produced in a similar manner to the example 1.

Comparative Example 2

In the case of an external temperature of approximately 5° C., the polymerization of the vinyl chloride monomer was conducted in a similar manner to that described for the example 1, and then when the internal pressure of the polymerization vessel had fallen to 0.6 MPa, an attempt was made to add 100 g of 2,6-di-t-butyl-4-sec-butylphenol via the supply line, without dilution in methanol, but the 2,6-di-t-butyl-4-sec-butylphenol solidified, blocking the supply line and preventing the addition. The unreacted monomer was then recovered, and the product polymer produced in a similar manner to the example 1.

The physical properties and characteristics of each of the products were evaluated using the methods described below. The evaluation results are shown in Table 1.

(Bulk Specific Gravity)

This property was measured in accordance with JIS K-6721.

(Plasticizer Absorption Quantity)

Glass fiber was placed in the bottom of an aluminum alloy vessel of internal diameter 25 mm and depth 85 mm, and 10 g of a sample resin was then placed in the vessel. 15 cc of DOP (dioctyl phthalate) was then added, and the vessel was left to stand for 30 minutes to allow the DOP sufficient time to penetrate. Subsequently, excess DOP was removed by centrifuging at an acceleration of 1500 G, the amount of DOP adsorbed onto the resin was determined, and this amount was then presented as an absorption quantity per 100 g of resin.

(Plasticizer Absorptivity)

400 g of a vinyl chloride polymer was fed into a Plasti-Corder planetary mixer (manufactured by Brabender Corporation) (jacket temperature: 83° C.), the polymer was heated for 4 minutes with continuous kneading at 60 rpm, and 200 g of dioctyl phthalate was then added. The time taken from the addition of the DOP until the kneading torque of the planetary mixer reached a minimum was measured as the "dry-up" time, and this time was used as an indicator of the plasticizer absorptivity.

(Anti-Initial Discoloration)

1.5 g of a tin based stabilizer and 50 g of DOP were combined with 100 g of a vinyl chloride polymer, and following kneading of the mixture for 5 minutes at 160° C. using a two roll mill, a sheet of thickness 0.8 mm was formed.

This sheet was subsequently cut and overlapped, placed inside a molding frame of dimensions 4×4×1.5 cm, and then pressure molded at a temperature of 160° C. and a pressure of 6.5 to 7 MPa to form a test sample. This test sample was then analyzed using a photoelectric colorimeter (manufactured by Nippon Denshoku Co., Ltd.) and the value of the psychometric lightness L in the Hunter's color difference formula disclosed in JIS-Z8730 (1980) was determined, and the values of the psychometric chroma coordinates a and b were measured. The anti-discoloration property of the polymer was then evaluated based on these measured results, and each evaluation was recorded in Table 1 using the following encoding.

Good: O
Unsatisfactory: X
(Roll Fish Eye)

[Composition]
| | | |
|---|---|---|
| | Product polymer | 100 g |
| | Tin stabilizer | 2.2 g |
| | Pigment | 0.6 g |
| | Lubricant | 0.8 g |
| | DOP | 50 g |

A mixture prepared with the above composition was kneaded for 5 minutes at 140° C. using a six roll mill, and was then formed into a sheet of width 15 cm and thickness 0.22 mm.

The number of transparent spots across the entire surface of the sheet was counted, and the total number was recorded in Table 1 as the roll fish eye value.

TABLE 1

| | Example 1 | Example 2 | Comparative Example 1 | Comparative Example 2 |
|---|---|---|---|---|
| Bulk specific gravity (g/cm³) | 0.556 | 0.554 | 0.540 | 0.559 |
| Plasticizer absorption quantity | 25.5 | 25.2 | 25.0 | 24.5 |
| Plasticizer absorptivity (minutes) | 12.9 | 12.7 | 13.0 | 15.0 |
| Anti-initial Discoloration (L) | 72.3 | 72.5 | 72.1 | 71.0 |
| (a) | −1.9 | −2.0 | −1.8 | −1.9 |
| (b) | 12.7 | 12.9 | 13.0 | 14.0 |
| Anti-initial Discoloration | O | O | O | X |
| Roll fish eye | 17 | 15 | 20 | 50 |

As is clearly evident from the results in Table 1, according to a production method of the present invention, a reaction inhibitor can be supplied to a polymerization vessel without blocking the reaction inhibitor supply piping, even in cold temperatures, and furthermore a vinyl chloride based polymer can be produced which displays a quality which compares favorably with conventional production methods.

As is clearly evident from the description above, according to a method of producing a vinyl-based polymer of the present invention, a vinyl chloride based polymer of a quality which compares favorably with conventional production methods can be produced without any problems associated with blocked piping and the like, even if the operation of supplying the reaction inhibitor is conducted at a low temperature. The method of the present invention is particularly effective in the case of an external temperature of 10° C. or lower. Furthermore, because the method uses no organic solvent, the method is safer for the operators involved, and free of environmental pollution problems.

What is claimed is:

1. A method of producing a vinyl-based polymer by polymerizing a vinyl monomer via a radical reaction, wherein a reaction inhibitor comprising a compound represented by the general formula (1):

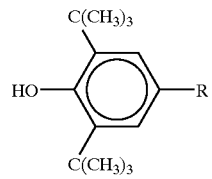

(1)

wherein, R represents an alkyl group of 3 to 6 carbon atoms, is added to a polymerization system within an aqueous dispersion.

2. The method of producing a vinyl-based polymer according to claim 1, wherein said vinyl monomer is vinyl chloride.

3. The method of producing a vinyl-based polymer according to claim 1, wherein said reaction inhibitor is 2,6-di-tert-butyl-4-sec-butylphenol.

4. The method of producing a vinyl-based polymer according to claim 1, wherein said aqueous dispersion comprises a dispersant in addition to an aqueous medium and a reaction inhibitor.

5. The method of producing a vinyl-based polymer according to claim 4, wherein said dispersant is either one of an emulsifier and a suspension agent.

6. The method of producing a vinyl-based polymer according to claim 4, wherein said dispersant is any one of a water soluble polymer, a nonionic surfactant, a higher alcohol based surfactant and an anionic surfactant.

7. The method of producing a vinyl-based polymer according to claim 4, wherein said dispersant is a water soluble partially saponified polyvinyl alcohol.

8. The method of producing a vinyl-based polymer according to claim 7, wherein a saponification ratio of said water soluble partially saponified polyvinyl alcohol is from 70 to 92 mol %.

9. The method of producing a vinyl-based polymer according to claim 7, wherein a degree of polymerization of said water soluble partially saponified polyvinyl alcohol is no more than 2500.

10. The method of producing a vinyl-based polymer according to claim 1, wherein said aqueous dispersion comprises 1.0 to 80 parts by weight of a reaction inhibitor, 0.25 to 10 parts by weight of a dispersant, and 40 to 80 parts by weight of water, per 100 parts by weight of said aqueous dispersion.

11. The method of producing a vinyl-based polymer according to claim 1, wherein said reaction inhibitor is added to said polymerization system during at least one stage of prior to commencement of polymerization, during polymerization, and at or after the completion of polymerization, depending on a desired effect.

12. The method of producing a vinyl-based polymer according to claim 1, wherein a quantity of said reaction inhibitor added is within a range from 0.0005 to 0.5 parts by weight per 100 parts by weight of said vinyl monomer, depending on a desired effect.

* * * * *